Dec. 19, 1961     KIYOSHI INOUE     3,014,155
SPARK DISCHARGE MACHINING ENERGY SOURCE
Filed Feb. 16, 1960                         4 Sheets-Sheet 1

INVENTOR.
KIYOSHI INOUE
BY
Reynolds, Beach & Christensen
ATTORNEYS

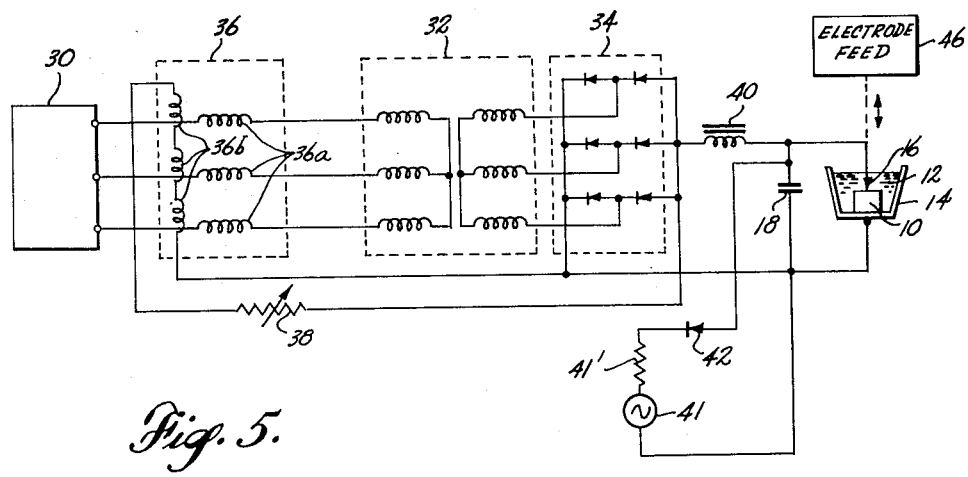
Fig. 5.
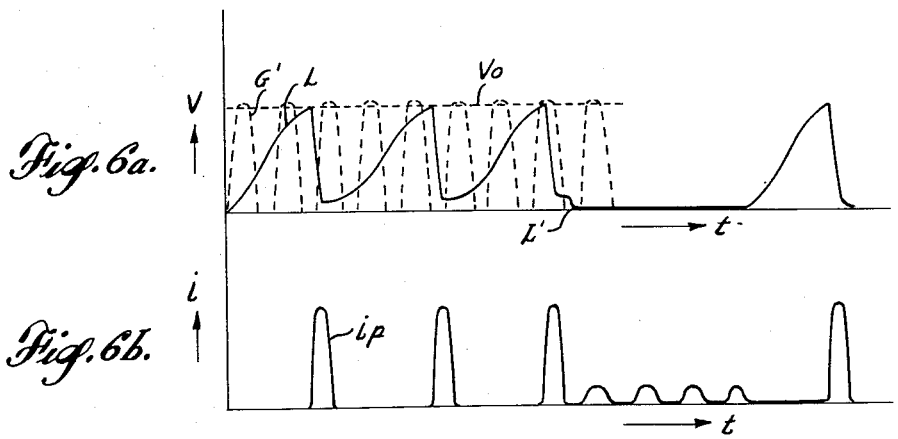
Fig. 6a.
Fig. 6b.

INVENTOR.
KIYOSHI INOUE

United States Patent Office 3,014,155
Patented Dec. 19, 1961

3,014,155
SPARK DISCHARGE MACHINING ENERGY
SOURCE
Kiyoshi Inoue, 182 Yoga Tamagawa Setagaya-ku,
Tokyo, Japan
Filed Feb. 16, 1960, Ser. No. 8,960
Claims priority, application Japan Feb. 16, 1959
17 Claims. (Cl. 315—171)

This invention relates to a new and improved spark discharge machining apparatus of the type employing the intermittent discharge of an energy storage condenser in order to effect removal of metal by an electrode. The invention is herein illustratively described by reference to the presently preferred embodiments thereof; however, it will be recognized that certain modifications and changes therein with respect to details may be made without departing from the underlying essentials involved. Reference is herein made to application Serial No. 712,349 of the present applicant, filed January 31, 1958, entitled Electric Spark Machining Apparatus, since issued as Patent No. 2,924,751, dated Feb. 9, 1960, for background information pertinent to certain aspects of the present case.

In machining by producing spark discharges between an electrode and work-piece immersed in a machining fluid, such as a dielectric liquid, it is essential that the intermittent spark discharges be of extremely short duration, yet possess high energy content and recur as rapidly as possible in order to achieve maximum machining rates. One problem involved in satisfying these conditions is to insure substantially complete de-ionization of the spark gap medium after each impulse before the succeeding impulse can occur, in order to avoid prolonged discharges which are referred to as "arcing discharges," usually of a duration in excess of one millisecond. When arcing occurs, damage is done to the work surface and control is lost as well as machining speed and efficiency. When a storage capacitance is connected across the spark discharge gap and is intermittently charged from a primary energy source, so as to discharge through the gap when the critical ionization voltage is reached, more rapid machining speeds and higher efficiency are obtained when a variable impedance is interposed in the condenser charging circuit and is controlled as mentioned in the above-cited case. Two essential functions are performed by the controlled-impedance circuit. First is that of establishing a high initial charging impedance during the beginning of the charging period so that the critical ionization of breakdown voltage of the spark gap, still not fully recovered or de-ionized from the preceding spark discharge pulse, is not exceeded by an excessively rapid initial rise of condenser voltage. The second function is that of progressively decreasing the charging impedance to a very low value as the charging of the condenser progresses, so that the necessary total charge is acquired in a very short time. Such impedance control is accomplished readily by controlling the value of a saturable reactance in accordance with condenser or spark gap instantaneous voltage. The overall result is to provide an average charging circuit impedance which is relatively low, although it may fluctuate up and down with changes in machining conditions, all the while maintaining instantaneous values of charging circuit impedance which vary during each charging period so as to avoid the problem of arcing at the gap.

Such a system as described in the preceding paragraph is rapid and efficient, but it has been found to possess a serious shortcoming toward which the present invention is directed. It is recognized by those skilled in the art, of course, that a mechanical servomechanism is used to maintain as accurately as possible the extremely short and critical spark gap distance between the electrode and work-piece surface which is necessary for efficient machining by the spark discharge principle. Because of the nature of servomechanisms generally, however, it is impossible to maintain the ideal gap at all times and occasionally short-circuit conditions can develop wherein fusions or welds between peaks of metal on one surface and the metal in the opposing surface provide a conductive bridge across the gap. When this occurs in the improved system described above, it immediately reduces the storage condenser voltage substantially to zero and thereby increases the condenser charging circuit impedance to a very high value. Consequently, accumulation of condenser charge sufficient to pass an impulse of current through the gap sufficient to melt the fused metal and separate the electrode and work-piece is impossible, while the very high impedance in the condenser charging circuit precludes any steady-state flow of current through the gap which is adequate to accomplish that result. The system is thereby temporarily disabled by the short-circuit condition.

In solving this problem, the present invention has in view the importance of providing an auxiliary energy source which is capable of stand-by operation in order to clear a short-circuit condition the instant it occurs, yet to impose no deleterious condition on the normal machining system which would reduce its efficiency or its machining speed, or which would produce arcing. In other words, one of the difficulties in solving the aforementioned problem is to provide additional means in a combined circuit, which means will be fully compatible with the basic objectives of the normal machining system.

With these considerations in view, very successful results have been obtained by connecting a relatively high-frequency energy source across the storage condenser in parallel with the primary or normal machining energy source, with the high-frequency auxiliary source circuit having an impedance which is high in relation to the average impedance of the primary source under normal machining conditions, yet which is low in relation to the instantaneous impedance of the normal charging circuit during the initial portion of each charging period of the condenser. As such, the auxiliary source circuit impedance will therefore also be low in relation to the normal charging circuit impedance when the spark gap is short-circuited, so that the auxiliary source is thereby capable of delivering substantial current to the spark gap in order to clear the short-circuit condition while the normal source is disabled by that condition. The instant the gap is cleared, however, normal operation resumes and, because of the relatively high impedance of the auxiliary source circuit in comparison with the average impedance of the normal source circuit, the auxiliary source circuit has no function or deleterious effect on the normal machining operation.

As a further feature, based on observations that even the average impedance of the normal charging circuit tends to fluctuate up and down with changes in machining conditions (i.e., changes in gap distance or length, changes in other gap conditions, etc.), the auxiliary supply circuit includes half-wave rectifier means in series therewith as a means to further isolate the auxiliary high-frequency supply circuit from the gap during normal machining operation should there be a tendency for the average impedance of the normal supply circuit to rise to a value approaching that of the impedance of the auxiliary supply circuit, so that the latter supply circuit could conceivably have a tendency to produce arcing at the electrode. In other words, the rectifier means constitutes an additional safeguard which, in many cases, may be unnecessary but which, at relatively low cost provides additional assurance that the high-frequency auxiliary supply circuit can have no deleterious effect on the system during normal machining operations.

These and other features, objects and advantages of the invention will become more fully evident from the following description thereof by reference to the accompanying drawings.

FIGURE 5 is a schematic diagram of one form of the present invention.

FIGURE 6A is a voltage-time diagram illustrating operation of the circuit in FIGURE 5.

FIGURE 6B is a current-time diagram illustrating operation of the circuit in FIGURE 5.

Figure 1:
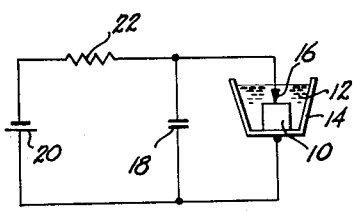
FIGURE 1 is a simplified schematic diagram of a conventional prior art R-C pulsing circuit for spark discharge machining.

In the prior art circuit shown in FIGURE 1, the work-piece 10 is immersed in a dielectric fluid 12 contained in a tank 14, and an electrode 16 is positioned in close proximity to the desired working point on the work-piece 10. Suitable means (not shown) maintain an approximately constant spark gap spacing between the electrode and work-piece which is conducive to spark discharge conditions under the voltage applied by the pulsing circuit. The pulsing circuit comprises the energy storage condenser 18 which is connected across the direct-voltage source 20 through an intervening charging resistance 22 which prevents direct discharge of the energy source 20 through the spark gap and which therefore limits the rate of charge of the condenser 18 according to the well known exponential function. The circuit operates like a relaxation oscillator.

Figure 2:
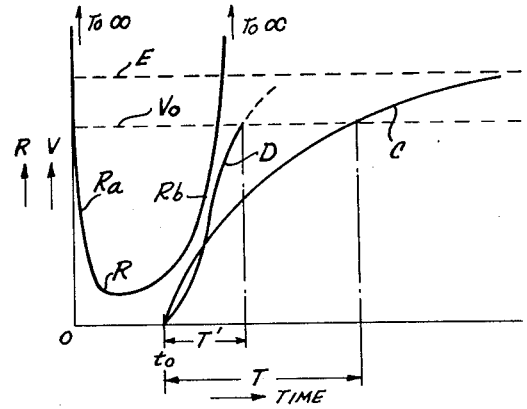
FIGURE 2 is a graphic diagram illustrating certain principles of operation of a circuit of this general type.

The exponential charging function for the condenser 18 is shown by the curve C in FIGURE 2, it being noted that the point at which charging of the condenser 18 commences is represented by the point of time $t_0$ and that the condenser voltage rises asymptotically toward the value E which represents the voltage of the supply 20. The lower voltage level $V_0$ represents the ionization voltage of the spark discharge gap existing between work-piece 10 and electrode 16. When the increasing condenser voltage reaches this value, spark discharge occurs across the gap and the condenser quickly discharges to a reduced voltage which is insufficient to maintain ionization of the gap.

Assuming in FIGURE 2 that such a discharge has been initiated at the point of time equal to zero, gap resistance drops from an effectively infinite value to a very low value representing full ionization of the gap region, as depicted by the portion $R_a$ of the resistance curve R shown in the figure. Upon substantial completion of condenser discharge, gap resistance commences its recovery. This occurs slowly at first and then more rapidly, as depicted by the curve portion $R_b$. In the meantime, the condenser commences to re-charge through resistance 22, and as long as the re-charging takes place at a rate which avoids intersection of the curves R and C (that is, so that the recharging potential on the condenser does not overtake the de-ionization condition or resistance recovery of the spark discharge gap), the condenser will be permitted to fully re-charge before the gap again breaks down. In this manner arcing (i.e., sustained ionization and current flow) is avoided. It will be seen from this qualification that a limit is imposed on the magnitude of the voltage of source 20; also, upon the permissible reduction of size of resistance 22, as ways to increase the repetition frequency of the condenser discharges and thus machining rates. It will further be apparent that attempts to modify the time-constant of the R-C pulsing circuit during the charging cycle of the condenser must take into consideration the limitation mentioned, namely, the avoidance of intersection of the rechrging curve for the condenser with the ionization condition of the gap. Thus, the curve D in FIGURE 2 depicts the charging characteristic of a condenser which has been placed in a variable-impedance (i.e., variable time-constant) charging circuit as a means to perform two functions. One is to increase the charging rate of the condenser progressively to a high value as the condenser approaches full charge and thereby decrease the charging time. The second function is to provide a high instantaneous charging impedance initially during the charging period so as to avoid re-ionization of the spark gap medium by avoiding an excessive initial rise of condenser voltage to a value above the critical breakdown value of the gap, which is still not fully recovered from the previous discharge. A charging characteristic such as D permits rapid, efficient machining without arcing problems, as previously explained, however, it yields a circuit which itself is virtually disabled by the occurrence of a short-circuit condition at the spark gap.

Figure 3A:
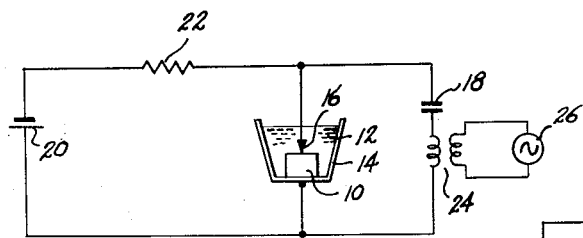
FIGURE 3A is a simplified schematic diagram of a prior art attempt to modify the basic R-C pulsing circuit in such a way as to provide auxiliary high-frequency impulses to clear the spark gap of welded tips of fusion points which represent short-circuit conditions.

In FIGURE 3A a prior proposal is illustrated wherein the secondary of a high-frequency transformer 24 is connected serially in the charging circuit of condenser 18 and the primary of this transformer is connected across the output terminals of a high-frequency oscillator 26. The purpose of the high-frequency energy superimposed on the direct voltage was to facilitate the discharge across the gap, and particularly to make possible increased pulsing rates in the circuit as well as provide an energy source which will clear the gap of fusions in the event of a short-circuit condition. This circuit reduces to the symbolic form shown in FIGURE 3B wherein the high-frequency energy source serially interposed in the condenser charging circuit delivers a voltage $e \sin (\omega t + \Theta)$. Gap voltage is shown as the variable quantity V.

Figure 3B:
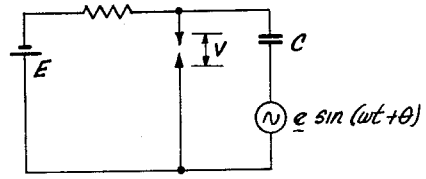
FIGURE 3B is a simplified equivalent version of the circuit appearing in FIGURE 3A.
Figure 4:
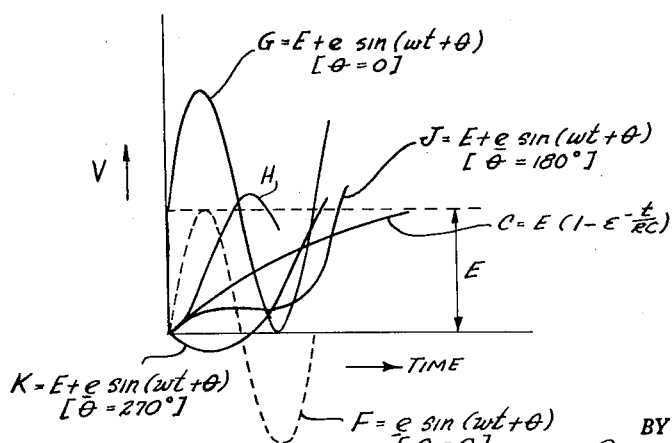
FIGURE 4 is a graphic diagram illustrating certain operating principles in the circuits of FIGURES 3A and 3B.

In FIGURE 4, depicting the conditions which may occur in FIGURE 3B, it will be observed that the effective condenser charging voltage represents the sum of the source voltage E and the high-frequency voltage $e \sin (\omega t + \Theta)$. $\Theta$ is the relative phase angle of the high-frequency voltage while $e$ is the peak amplitude of such voltage and $\omega$ is the frequency in radians per second. If condenser voltage is assumed to be zero at the instant the high-frequency voltage F commences from zero on its positive excursion, this being the condition of $\Theta=0$, the resulting charging voltage in the circuit is represented by curve G and the variation of condenser voltage is represented by the curve H. Under these conditions it will be observed that the condenser charges much more rapidly than it does under the normal conditions wherein just the source voltage E is applied, as depicted by curve C. However, if the phase angle $\Theta$ is other than that just described (i.e., other than zero), the charging curve for the condenser will assume altogether different forms. For example, if $\Theta=270°$, the curve K results, whereas if $\Theta=180°$ the curve J results. Since under the described circuit arrangements it is not possible to predetermine the relative phase angle $\Theta$, and the phase angle may vary from time to time, any of different charging characteristics may occur. As a result, there is a definite limitation imposed on the allowable charging voltage E and on the reduction of size of resistance R as a means to increase the average pulsing rate in the circuit. This is true because under the conditions of curve H in FIGURE 4, for example, representing nearly the maximum charging rate for the condenser with a given set of conditions, the spark discharge gap will be prematurely ionized and the spark operation will degenerate into a continuous arcing operation damaging to both the electrode and the work-piece, assuming the circuit is designed to operate safely (i.e., without arcing) under such conditions as those represented by curves K or J, for example. In other words, because of the absence of a definite and permanently constant phase relationship between the initiation of the charge of condenser 18 and the sine wave of the auxiliary source 24, 26, it is not possible by the arrangement shown in FIGURE 3A to obtain maximum average machining rates without causing arcing conditions. Another incidental problem created by the circuit of FIGURE 3A is the tendency toward increased erosion of the machining electrode 16 as a result of the resonance condition which tends to develop on each spark discharge impulse due to the presence of the inductance in the secondary winding of the transformer 24.

In the improved circuit of this invention shown in one form in FIGURE 5 storage condenser 18 is charged by a primary supply which comprises the three-phase alternating current source 30, transformer 32, and full-wave rectifier 34. Interposed serially in the leads of the primary (or it may be the secondary if desired) of transformer 32 are the reactance coils 36a of saturable reactor 36. Saturable reactor control windings 36b are serially connected across the output of rectifier 34, with a variable resistance 38 interposed in the circuit in order to vary the level of energization of the control windings as a function of rectifier output voltage, and thereby to increase the reactance of the condenser charging circuit to a high value when condenser voltage is at a low value. An inductance 40 is interposed in the charging circuit of condenser 18, at a location between such condenser and the rectifier 34, as a means to isolate the discharge gap from the capacitance inherent in the rectifier elements, so that energy stored in such inherent capacitance does not discharge directly into the working gap.

The saturable reactor 36 is so designed and operated, by appropriate adjustment of resistance 38, that the reactance of windings 36a is very large when condenser voltage is low, which it is at the start of each charging period, also when the spark gap is short-circuited across the condenser. As condenser voltage progressively increases during each charging period, the resulting increase of current in control coils 36b progressively reduces the reactance of the windings 36a to a low value. This produces the charging curves L as shown in FIGURE 6A, comparable to curve D in FIGURE 2. When condenser voltage reaches the spark gap breakdown value, namely, voltage $V_0$, the condenser abruptly discharges through the gap, and the reactance of reactance windings 36a is again increased to a high value. If, as shown at L' in FIGURE 6A, a short-circuit condition develops across the gap between electrode 16 and workpiece 10, condenser voltage drops to an even lower value (i.e., substantially zero) and there are often points on the electrode and work surfaces at which the metals are fused or welded together. Under these conditions the reactance of windings 36a is then very high. This prevents any appreciable flow of charging current to the condenser 18 from the main supply and also prevents any appreciable direct flow of current directly through the spark gap sufficient to melt the fusion points and clear the short-circuit.

In solving this problem by means of the auxiliary supply circuit comprising high-frequency voltage source 41 connected directly across the spark gap and condenser 18, the auxiliary circuit impedance, symbolized at 41', is made high in relation to the average impedance of the normal charging circuit including windings 36a during normal machining operation. At the same time, impedance 41' is still made sufficiently low that ample current will flow through the spark gap to melt and remove any welds or fusions that may attend a short-circuit condition. Because of these impedance relationships, under normal machining conditions spark gap energization is influenced negligibly by the presence of the standby auxiliary supply source 41. Normal machining may be made as rapid and efficient as possible by the continuously variable control exercised over charging circuit impedance through the described use of reactor 36. The source 41 has no deleterious effect. Should a short-circuit develop, however, the normal charging circuit is disabled because of the resultant great increase in its impedance. At that same instant, depicted at L' in FIGURE 6A, impulses of current are delivered from auxiliary source 41, as depicted in FIGURE 6B, and are effective to clear the gap. Normal conditions are thereby instantly restored.

In some cases, especially where certain metals are being machined, or when certain spark gap conditions exist due to the nature of the electrode, the machining fluid medium, or servomechanism (feed 46), the average value of impedance of the normal charging circuit may fluctuate through an unusually wide range, so that at times the auxiliary source impedance 41' may be closely approached in value by said fluctuating average impedance. Should this occur, there could be a tendency for the auxiliary source to have an adverse effect, i.e., produce arcing in the spark gap. As a safeguard to overcome any such tendency it is found that a half-wave rectifier 42 may be interposed serially in the auxiliary source circuit with successful results. This rectifier should have the same polarity in relation to the electrode and work-piece as does the normal charging circuit. Its presence in the circuit not only safeguards against arcing but also steadies and regularizes the recurrence rate of the normal machining discharges.

It will therefore be apparent that the combined circuit shown in FIGURE 5 solves the short-circuit disablement problem while permitting operation on a normal condenser charging curve D which may be located very near the critical breakdown curve R so as to achieve high machining speeds and efficiencies without undesired arcing at the electrode. It will further be apparent that the relative phase angle of the auxiliary high-frequency source 41 is made virtually immaterial in this regard.

Figure 7:
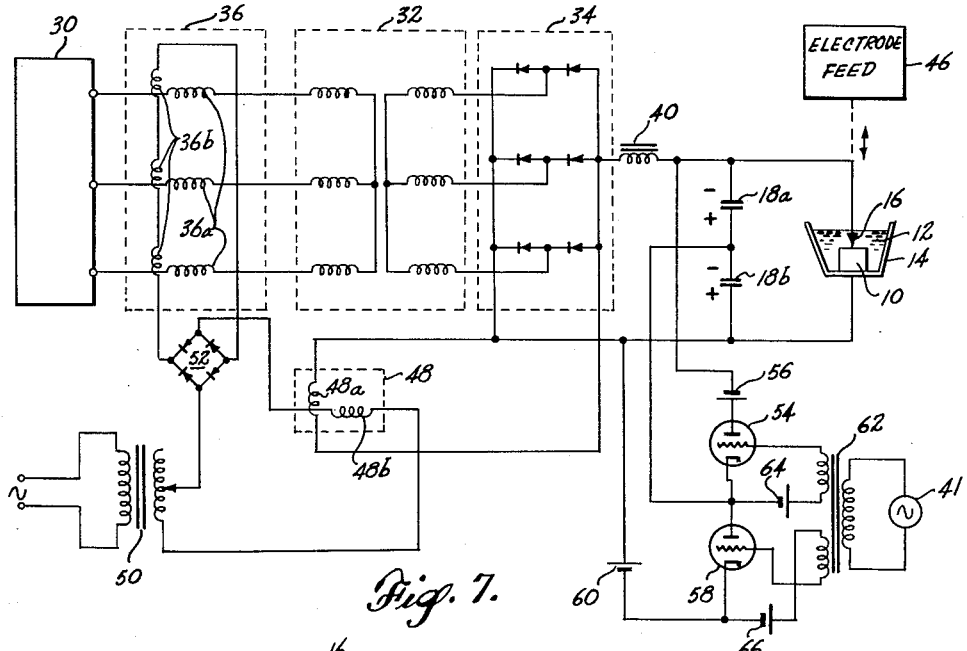
FIGURES 7, 8 and 9 are additional illustrative embodiments of the present invention.

In the modified circuit shown in FIGURE 7 parts which correspond to those in FIGURE 5 bear similar reference numerals. In this case, the effect of a variable control impedance in the main supply for the energy storage condenser is amplified by a suitable means such as the magnetic amplifier or saturable reactor 48 whose control winding 48a is connected across the output of rectifier 34 and whose alternating current or reactance winding 48b is connected in series with the secondary winding of transformer 50 and the input terminals of a rectifier bridge 52 whose output terminals are connected serially with the reactor control windings 36b. The primary of transformer 50 is impressed with alternating voltage from a suitable source (not shown). The secondary of the transformer is provided with an adjustable tap in order to vary the excitation level of the reactor windings 36b, equivalent to the variable resistance 38 in FIGURE 5.

Moreover, in FIGURE 7 a high-frequency auxiliary supply circuit is provided having high output impedance yet adequate current capacity to clear short-circuit fusions at the electrode. The storage capacitance by which normal machining is performed in this embodiment comprises two separate condensers 18a and 18b serially connected across the discharge gap 16, 10. The plate circuit of a vacuum tube valve or amplifier 54 is connected serially with condenser 18a and a plate voltage source 56 for the vacuum tube. Similarly, condenser 18b is connected serially with the plate circuit of a second vacuum tube amplifier 58 and its "B" supply 60. High-frequency energy source 41 is connected to the primary of a vacuum input amplifier 62 whose secondaries are connected with the polarities shown (i.e., relatively opposite polarities) across the grid-cathode circuits of the respective amplifiers 54 and 58, with suitable positive bias sources 64 and 66 respectively interposed in these grid circuits. It will be observed that the vacuum tubes 54 and 58 are connected to the respective condensers 18a and 18b with corresponding polarities, which polarities are such that the high-frequency auxiliary circuit tends to charge the condensers with a direct voltage of the same polarity as that provided to them from the main supply.

Because, in FIGURE 7, the impedance represented primarily by the plate resistance of the vacuum tubes 54 and 58 is large in relation to the average impedance of the reactance windings 36a under normal machining conditions, the auxiliary supply (41, 54, 58, etc.) does not affect the normal functioning of the apparatus. However, when a short-circuit condition develops, pulses of current are delivered from the vacuum tube amplifiers directly to the spark discharge gap on every half cycle of the source 41 in order to clear the short circuit.

Figure 8:
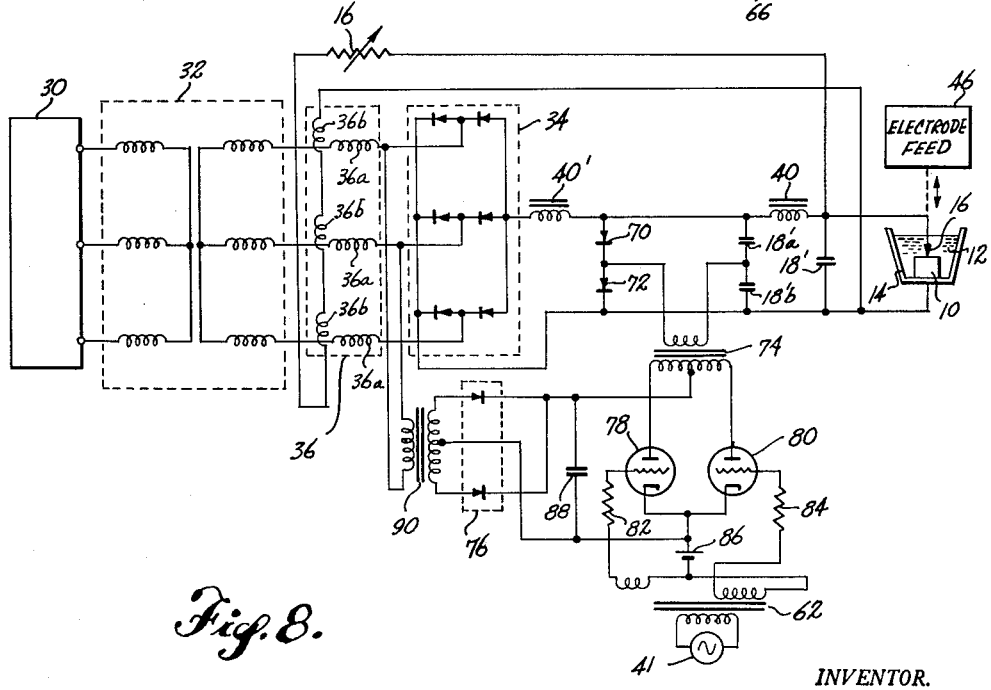

In the further modification shown in FIGURE 8, parts which correspond to similar parts in FIGURE 7 bear corresponding reference numerals. In this case, the main storage capacitance for normal machining is designated 18′ and, as before, is connected directly across the electrode and work-piece. A pair of condensers 18′a and 18′b are connected serially across the condenser 18′ with choke 40 interposed in one conductor between the pair and the storage condenser. A second choke 40′ is interposed between the full-wave rectifier 34 and the condensers 18′a and 18′b. Half-wave rectifiers 70 and 72 are serially connected across the output of rectifier 30 between the two chokes 40 and 40′, and the secondary of the high-frequency transformer 74 is connected between the junctions of the pair of rectifiers and pair of condensers as shown. The primary of transformer 74 has a mid-tap which is connected to the output of a full-wave rectifier 76 and end terminals which are connected to the anodes of vacuum tubes 78 and 80. The grids of these vacuum tubes are energized by the secondaries of high-frequency transformer 62, the grid circuits including grid leak resistances 82 and 84 and a common grid bias source 86. A filter condenser 88 is connected between the output of rectifier 76 and the common cathode lead of amplifiers 78 and 80. Plate voltage supply for these two vacuum tubes is derived through the rectifier 76 from the transformer 90 whose primary is energized from the output side of the saturable reactor 36. Thus, in the event of a short-circuit condition developing across the spark gap the resulting large increase of impedance of the reactance windings 36a results in a proportionate decrease in the energization of transformer 90, hence in the plate voltage available for amplifiers 78 and 80. Consequently, the rectified voltage impulses which are applied to the condensers 18′a and 18′b, and thereby to the spark gap, during the existence of the short-circuit condition are within the capacity of the amplifiers 78 and 80 to deliver impulses of current for charging the condensers and destroying the fusions which exist in the spark gap and produce the short-circuit condition. However, when the circuit is operating normally, the impedance of the reactor windings 36a is, on an average, materially lower than the plate resistance of amplifiers 78 and 80 effectively so that substantially the entire normal machining current flowing to main storage condenser 18′ comes by way of the main supply including voltage source 30 and full-wave rectifier bank 34. The polarities of the connections of the secondary transformer 74 and of rectifiers 70 and 72 in relation to the polarity of rectifier 34 is such that the charges delivered to condensers 18′a and 18′b from the high-frequency auxiliary source including high-frequency oscillator 41 is the same as that produced by the main supply in condenser 18′. The merit of the circuit in FIGURE 8, therefore, lies in the adaptability of the high-frequency auxiliary supply comprising oscillator 41 and vacuum tube valves 78 and 80 to automatically clear fusions and welded points of metal short-circuiting the spark gap, without overloading the vacuum tubes 78 and 80 in so doing, and yet during normal machining operations to not only act in a standby capacity for the foregoing described purpose but also to undergo variations in output voltage delivered to condensers 18′a and 18′b which bear a more or less constant relationship to the available voltage from the main supply, so that any limited effect of the auxiliary circuit on the operation of the main supply remains more or less constant throughout variations in the distance of the spark gap effected by the electrode feed 46. Inductance 40 isolates the spark gap from the main supply circuit and from the capacitances 18′a and 18′b during normal machining discharges in the gap, as a further safeguard against arcing at the gap.

Figure 9:
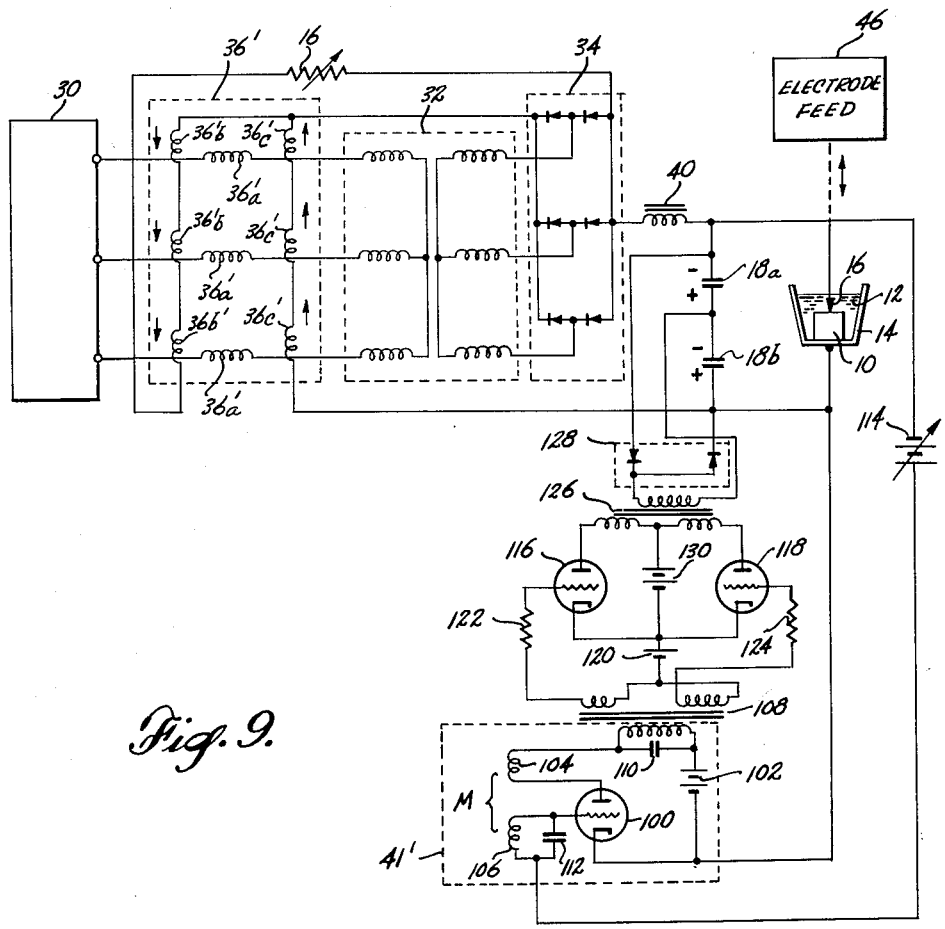

In FIGURE 9 parts which correspond to those in FIGURES 7 and 8 bear corresponding reference numerals. In FIGURE 9 the circuit is arranged so that the high-frequency oscillator is biased to be inoperative during normal machining conditions but in the event of short-circuit conditions occurring the same is rendered operative as a means to clear the gap of the metal fusions by applying energy impulses on every half cycle of the high-frequency oscillator output. Such inoperativeness of the oscillator during normal machining conditions reduces power consumption in the circuit and increases the life of components in the high-frequency auxiliary supply. Also it constitutes a further safeguard against possible arcing in the event, during fluctuations of average impedance of the main supply circuit, such average would tend to become so high that a circuit such as that in FIGURE 5, for example, might have arcing tendencies.

Referring to the circuit diagram (FIGURE 9), the saturable reactor 36′ in this case comprises two sets of control windings 36′b and 36′c which are differentially energized. The windings 36′b are connected to be energized directly from the output of the full-wave rectifier bank 34, whereas the control windings 36′c, of opposite polarity, are connected across the spark discharge gap leads on the side of the choke 40 opposite that connected directly to the gap and the paired condensers 18a and 18b. Windings 36′c have greater effect than windings 36′b. The high-frequency source 41′ comprises the high-frequency oscillator tube 100, the plate supply 102, the high-frequency transformer primary 104 in the plate circuit, the high-frequency transformer secondary 106 in the grid-cathode circuit, and the primary of the output transformer 108, such primary being by-passed by the condenser 110 which produces resonance at the oscillator frequency. The high-frequency oscillator transformer secondary 106 is similarly by-passed by a tank condenser 112. Serially connected in the grid-cathode circuit of oscillator tube 100 is the spark discharge gap comprising electrode 16 and work-piece 10, and the bias source 114. Under normal machining conditions the spark discharge gap voltage (i.e., that across the series condensers 18a and 18b), which is opposite in polarity to that of the positive bias source 114, prevents oscillation of the oscillator 41′. However, when a short circuit develops across the gap the bias voltage from source 114 prevails and the oscillator is rendered operative in order to deliver energizing signals to the grid circuit of the push-pull amplifier comprising tubes 116 and 118. These tubes have a common cathode return and a common negative bias source 120 interposed in the grid-cathode circuit for each, such circuit including the secondary of coupling transformer 108 and the grid-leak resistances 122 and 124. The plate circuits of the respective tubes include the two halves of the center-tapped primary of output transformer 126 whose secondary is connected to the full-wave rectifier 128 providing charging current to the two condensers 18a and 18b. The tubes 116 and 118 have a common plate supply 130. The polarity of full-wave rectifier 128 in relation to the polarity of the rectifier bank 34 is the same, so that the charges delivered to the storage condensers from the main supply (30 et seq.) are of the same polarity as those delivered by the auxiliary supply (100 et seq.)

It will therefore be apparent that the invention in its illustrated forms provides an improved spark discharge machining apparatus having instantly acting means operable to eliminate welds or fusions between the electrode and work-piece without interfering with the normal operation of the pulsing condenser variable-impedance charging circuit nor tending to cause arc discharges at the gap which would be damaging to both the electrode and the work. It will be recognized that the component types illustrated are merely representative, that transistors are usable in lieu of vacuum tubes, and that various other substitutions or modifications are possible within well known design considerations in this art. These and other aspects of the invention will be recognized by those skilled in the art on the basis of the foregoing disclosure.

I claim as my invention:

1. In electric spark discharge machining apparatus including a work piece support, a machining electrode, means for positioning said electrode in relation to a work piece on said support to establish a spark discharge gap between the electrode and work piece normally of predetermined width but subject to variations and to short circuiting by metal fusions between the electrode and work piece, and storage capacitance means adapted to be connected across the electrode and work piece, the combination therewith comprising a main direct-voltage energy supply including a charging circuit connecting the same to said capacitance means for cumulatively charging the latter to a voltage at which said spark gap ionizes and thereby discharges said capacitance means, said charging and discharging occurring intermittently at a predetermined recurrence rate dependent on said spark gap width, said main energy supply having an impedance including a variable impedance element interposed in said charging circuit and determining the magnitude of charging current flowing therein to said capacitance, and control means operatively associated with said variable impedance to control the impedance value thereof, said control means being responsively connected to said charging circuit at a relative location therein between said gap and said variable impedance, said control means being operable to vary said variable impedance inversely in relation to variations in capacitance voltage, thereby to decrease said variable impedance progressively during accumulation of charge on said capacitance from an initially high value to a relatively low value, and auxiliary supply means including a source of fluctuating voltage, connected across said capacitance means, said auxiliary supply having an impedance which is larger than the average impedance of said main energy supply, whereby said auxiliary supply melts said short-circuiting fusions when said variable impedance value is high, and whereby during the absence of such fusions flow of discharge current through the gap derives primarily from the discharges of said capacitance charged from said main supply.

2. The combination defined in claim 1, wherein the auxiliary supply means source comprises a relatively high-frequency alternating voltage source, and rectifier means interposed between said source and the capacitance means.

3. The combination defined in claim 2, wherein the rectifier means comprises a half-wave rectifier connected with a polarity which charges the capacitance means with the same polarity as the charge delivered by the main supply.

4. The combination defined in claim 2, wherein the capacitance means includes a main condenser connected directly across the gap, a pair of condensers serially connected across the charging circuit between the variable impedance and said main condenser, a choke interposed in one side of the charging circuit between said main condenser and said pair, and wherein the auxiliary supply rectifier comprises half-wave rectifier means connected between each of the pair condensers and the alternating voltage source, with polarities the same as that of said main supply.

5. The combination defined in claim 1, and half-wave rectifier means interposed in the connection of the auxiliary supply to the capacitance means.

6. The combination defined in claim 2, wherein the capacitance means comprises two condensers serially connected across the gap, and wherein the rectifier comprises a half-wave rectifier interposed between the alternating voltage source and each of the respective condensers to change the same with like polarity.

7. The combination defined in claim 2, wherein the high-frequency alternating voltage source comprises an energizing circuit which includes means responsive to variations in voltage across the capacitance means, said energizing circuit being operable in response to a reduction of voltage corresponding to short-circuit conditions in the gap to render said alternating voltage source operative to deliver voltage to the capacitance means, and being responsive to average normal voltage across the gap to render said alternating voltage source inoperative.

8. The combination defined in claim 1, wherein the main supply includes as source of alternating voltage, and saturable reactor means having a variable reactance winding comprising the variable impedance and a control winding comprising the control means, and rectifier means interposed between the variable reactance winding and the capacitance means.

9. In electric spark discharge machining apparatus including a work piece support, a machining electrode, means for positioning said electrode in relation to a work piece on said support to establish a spark discharge gap between the electrode and work piece normally of predetermined width but subject to variations and to short circuiting by metal fusions between the electrode and work piece, and storage capacitance means adapted to be connected across the electrode and work piece, the combination therewith comprising a main direct-voltage energy supply including a charging circuit connecting the same to said capacitance means for cumulatively charging the latter to a voltage at which said spark gap ionizes and thereby discharges said capacitance means, said charging and discharging occurring intermittently normally at a predetermined recurrence rate dependent on said predetermined spark gap width, and auxiliary supply means including a source of fluctuating voltage, connected across said capacitance means, said auxiliary supply having an impedance which is larger than the average impedance of said main energy supply.

10. The combination defined in claim 9, wherein the main supply comprises a source of alternating current, rectifier means interposed between said source and said capacitance means, and means to vary the impedance of the main supply from a relatively high value at the beginning of each condenser charging period to a relatively low value toward the end of such period.

11. The combination defined in claim 10, wherein the last-mentioned means comprises a saturable reactor having a reactance winding serially interposed between said source and said rectifier means and a control winding responsively connected across the charging circuit at the output side of the rectifier means, thereby to increase reactance winding impedance with a reduction of charging circuit voltage and decrease such impedance with an increase of such voltage.

12. The combination defined in claim 11, wherein the auxiliary source includes a source of alternating voltage of a frequency which is high relative to said recurrence rate, and a half-wave rectifier connecting said latter source and the capacitance means.

13. The combination defined in claim 12, wherein the auxiliary source includes a source of alternating voltage of a frequency which is high relative to said recurrence rate, and a half-wave rectifier connecting said latter source and the capacitance means.

14. The combination defined in claim 9, wherein the auxiliary source includes a source of alternating voltage of a frequency which is high relative to said recurrence rate, and a half-wave rectifier connecting said latter source and the capacitance means.

15. In electric spark discharge machining apparatus including a work piece support, a machining electrode, means for positioning said electrode in relation to a work piece on said support to establish a spark discharge gap between the electrode and work piece normally of predetermined width but subject to variations and to short circuiting by metal fusions between the electrode and work piece, and storage capacitance means adapted to be connected across the electrode and work piece, the combination therewith comprising a main direct-voltage energy supply including a charging circuit connecting the same to said capacitance means for cumulatively charging the latter to a voltage at which said spark gap ionizes and thereby discharges said capacitance means, said charging and discharging occurring intermittently at a predetermined recurrence rate dependent on said predetermined spark gap width, said main energy supply including rate-of-charge means operable to vary the flow of charging current to the capacitance from said main supply, and control means operatively associated with said rate-of-charge means and being responsively connected to said charging circuit at a relative location therein between said gap and said rate-of-charge means to increase said flow progressively during the accumulation of charge on said capacitance from a low initial rate to a relatively high rate approaching full accumulation of charge, and auxiliary supply means including a source of fluctuating voltage, connected across said capacitance means, said auxiliary supply having an impedance which is larger than the average total impedance of said main energy supply.

16. The apparatus defined in claim 15, wherein the fluctuating voltage source has a frequency which is higher than said predetermined recurrence rate.

17. In electric spark discharge machining apparatus including a work piece support, a machining electrode, means for positioning said electrode in relation to a work piece on said support to establish a spark discharge gap between the electrode and work piece normally of predetermined width but subject to variations and to short circuiting by metal fusions between the electrode and work piece, and storage capacitance means adapted to be connected across the electrode and work piece, the combination therewith comprising a main direct-voltage energy supply including a charging circuit connecting the same to said capacitance means for cumulatively charging the latter to a voltage at which said spark gap ionizes and thereby discharges said capacitance means, said charging and discharging occurring intermittently at a predetermined recurrence rate dependent on said predetermined spark gap width, said main energy supply including rate-of-charge means operable to vary the flow of charging current to the capacitance from said main source, and control means operatively associated with said rate-of-charge means and being responsively connected to said charging circuit at a relative location therein between said gap and said variable impedance to increase said flow progressively during the accumulation of charge on said capacitance, and auxiliary supply means including a source of fluctuating voltage, connected across said capacitance means, and said auxiliary supply being operable in response to a reduction of capacitance voltage during short circuit of the gap to pass current impulses through said gap which melt said fusions.

References Cited in the file of this patent

UNITED STATES PATENTS

| | | |
|---|---|---|
| 2,777,973 | Steele et al. | Jan. 15, 1957 |
| 2,924,751 | Kiyoshi Inoue | Feb. 9, 1960 |